United States Patent [19]
Hecht et al.

[11] Patent Number: 5,848,820
[45] Date of Patent: Dec. 15, 1998

[54] PIVOTABLE REAR SEAT CENTER CUSHION ASSEMBLY WITH UTILITY COMPARTMENT

[75] Inventors: Robert Hecht; Roman Jach, both of Trollhättan, Sweden

[73] Assignee: Lear Corporation, Southfield, Mich.

[21] Appl. No.: 883,967

[22] Filed: Jun. 27, 1997

[51] Int. Cl.⁶ .................................................. A47C 7/62
[52] U.S. Cl. ..................... 297/188.1; 297/113; 297/217.6
[58] Field of Search ............ 297/188.01, 188.08, 297/188.09, 188.1, 188.11, 188.04, 217.6, 217.3, 411.32, 411.3, 113, 112, 129, 236, 257, 248, 331, 335, 115; 224/926, 275, 487; 248/311.2

[56] References Cited

U.S. PATENT DOCUMENTS

| | | |
|---|---|---|
| 993,633 | 5/1911 | Ambrock . |
| 2,592,912 | 4/1952 | Knipper . |
| 3,131,968 | 5/1964 | Alt . |
| 5,195,711 | 3/1993 | Miller et al. . |
| 5,322,344 | 6/1994 | Hoffman et al. . |
| 5,328,233 | 7/1994 | Maule . |
| 5,390,976 | 2/1995 | Doughty et al. . |
| 5,433,503 | 7/1995 | De Filippo . |
| 5,492,068 | 2/1996 | McKee . |
| 5,556,017 | 9/1996 | Troy . |
| 5,720,514 | 2/1998 | Carlsen et al. . |

*Primary Examiner*—Milton Nelson, Jr.
*Attorney, Agent, or Firm*—Brooks & Kushman P.C.

[57] ABSTRACT

A vehicle rear seat assembly includes left and right rear seat portions with a center seat portion positioned therebetween. The center seat portion is pivotally connected with respect to the left and right seat portions. The center seat portion has a seat cushion on one side and a utility compartment on an opposing side thereof. The center seat portion is pivotable between a collapsed position for seating and an upright position for facilitating access to the utility compartment. The utility compartment preferably comprises a pivotable tray mounted therein for pivotal movement to a position extended from the utility compartment, as well as a cup-holder pivotally mounted within the utility compartment.

14 Claims, 5 Drawing Sheets

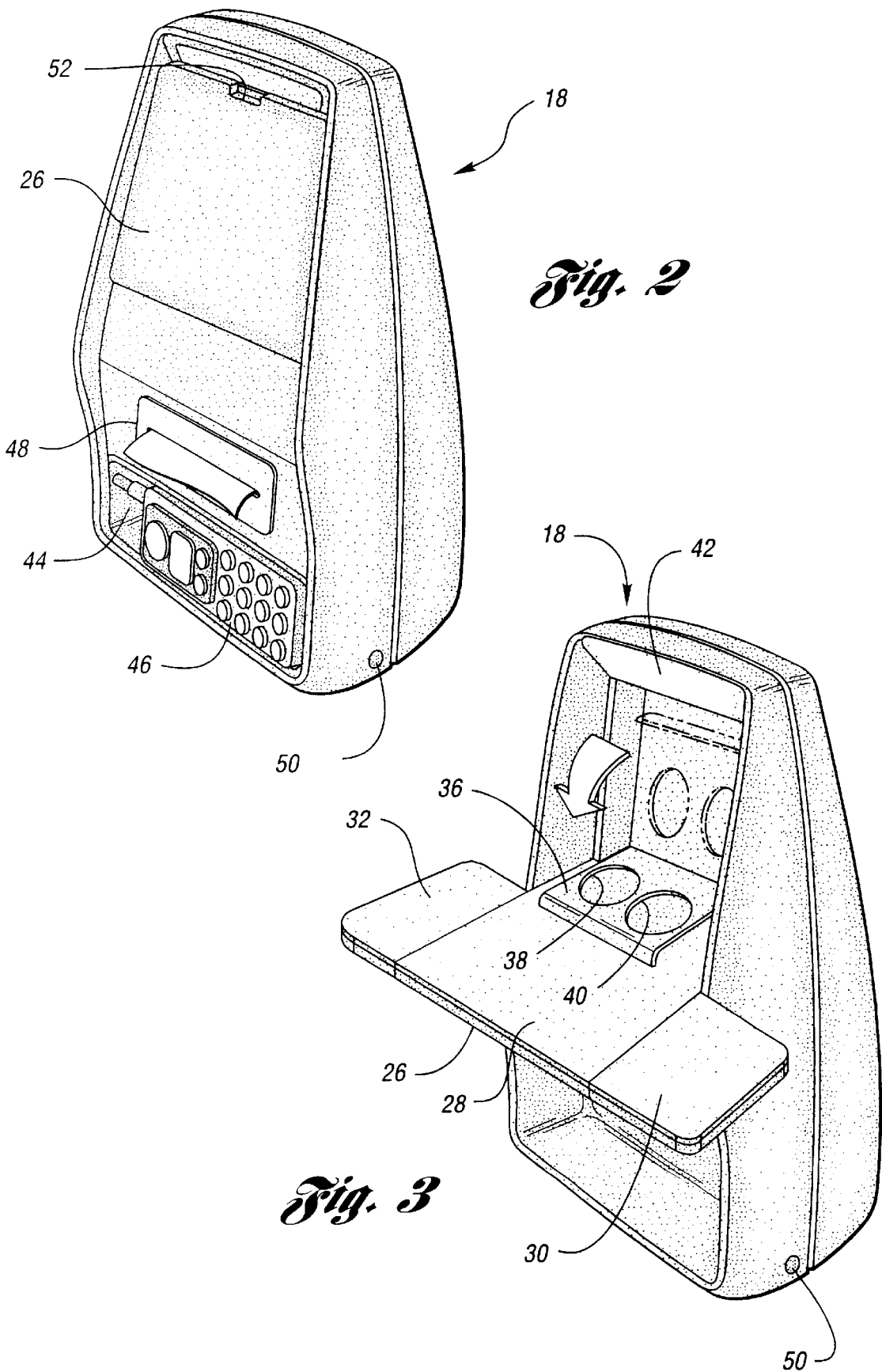

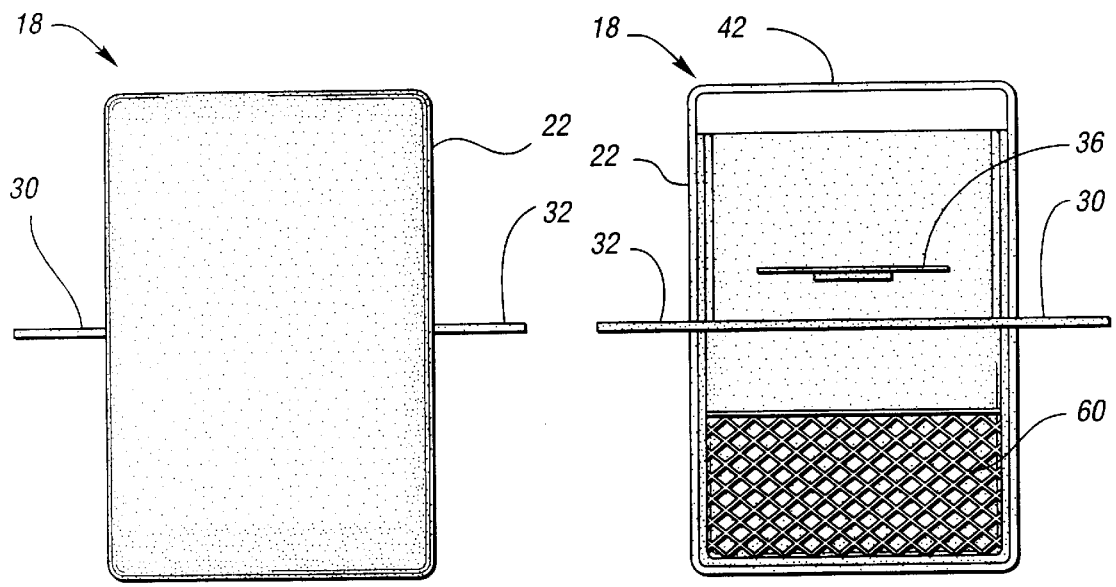
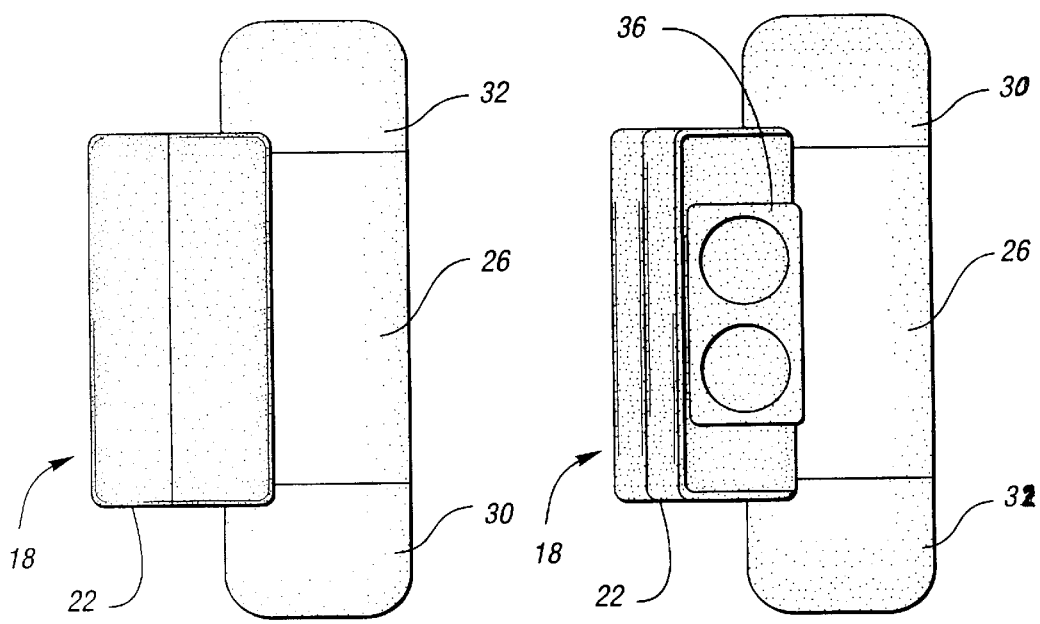

PIVOTABLE REAR SEAT CENTER CUSHION ASSEMBLY WITH UTILITY COMPARTMENT

TECHNICAL FIELD

The present invention relates to a vehicle rear seat assembly, and more particularly to a vehicle rear seat assembly with a center cushion which is pivotally mounted to the seat and includes a utility compartment therein.

BACKGROUND OF THE INVENTION

Vehicle interior passenger compartments often include collapsible cupholders and other convenience features for use by the front seat occupants. Often, vehicle cupholders are stored within the instrument panel or front console, and may be pulled out for use by the front passenger compartment occupants. Also, the glove box door is sometimes used as a support tray by front seat occupants.

However, rear seat occupants are typically not provided with the same privileges. Rear seat occupants are rarely provided with cupholders, nor support trays for supporting various items such as reading material, laptop computers, beverages, etc.

Accordingly, it is desirable to provide a vehicle rear compartment design which provides utility features, such as cupholders and a support tray, to the rear seat occupants, without creating a packaging problem, and without reducing normally useable rear seating space or rear occupant compartment space.

DISCLOSURE OF THE INVENTION

The present invention overcomes the above-referenced shortcomings of typical vehicle interior rear passenger compartment designs by providing a vehicle rear seat center cushion assembly which is pivotable to a vertical position for exposing a utility compartment, which includes a cupholder and utility tray.

More specifically, the present invention provides a vehicle rear seat assembly including left and right seat portions, and a center seat portion positioned between the left and right seat portions, and pivotally connected with respect to the left and right seat portions. The center seat portion has a seat cushion on one side and a utility compartment on an opposing side thereof, and the center seat portion is pivotable between a collapsed position for seating and an upright position for facilitating access to the utility compartment.

Preferably, the utility compartment includes a pivotable tray mounted therein for pivotal movement to a position extended from the utility compartment for providing a user surface when the center seat portion is in the upright position. The pivotable tray also preferably includes slidable side leaves connected thereto for expanding the user surface by laterally sliding the leaves with respect to the tray. The utility compartment also includes a pivotable cupholder, a reading light, and a mobile phone storage compartment.

Alternatively, an armrest may be pivotally connected to the seat back and include a slot formed therein for cooperation with the pivotable tray for supporting the tray in the extended position.

Accordingly, an object of the present invention is to provide a vehicle rear seat assembly which includes a collapsible utility compartment having a cupholder and a support tray disposed therein.

A further object of the present invention is to provide a vehicle rear seat cupholder and utility tray which are normally hidden beneath a pivotable rear seat center cushion assembly.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 2 shows a perspective view of an upright center seat portion with the utility tray in the closed position in accordance with the present invention;

FIG. 3 shows a perspective view of an alternative center seat portion with the utility tray in the extended position in accordance with the present invention;

FIG. 4 shows a front view of the center seat portion of FIG. 3;

FIG. 5 shows a rear view of the center seat portion of FIG. 3, with a storage net secured over the storage compartment;

FIG. 6 shows an underside view of the center seat portion of FIG. 3;

FIG. 7 shows a plan view of the center seat portion of FIG. 3;

DETAILED DESCRIPTION OF THE PREFERRED EMBODIMENTS

Figure 1:
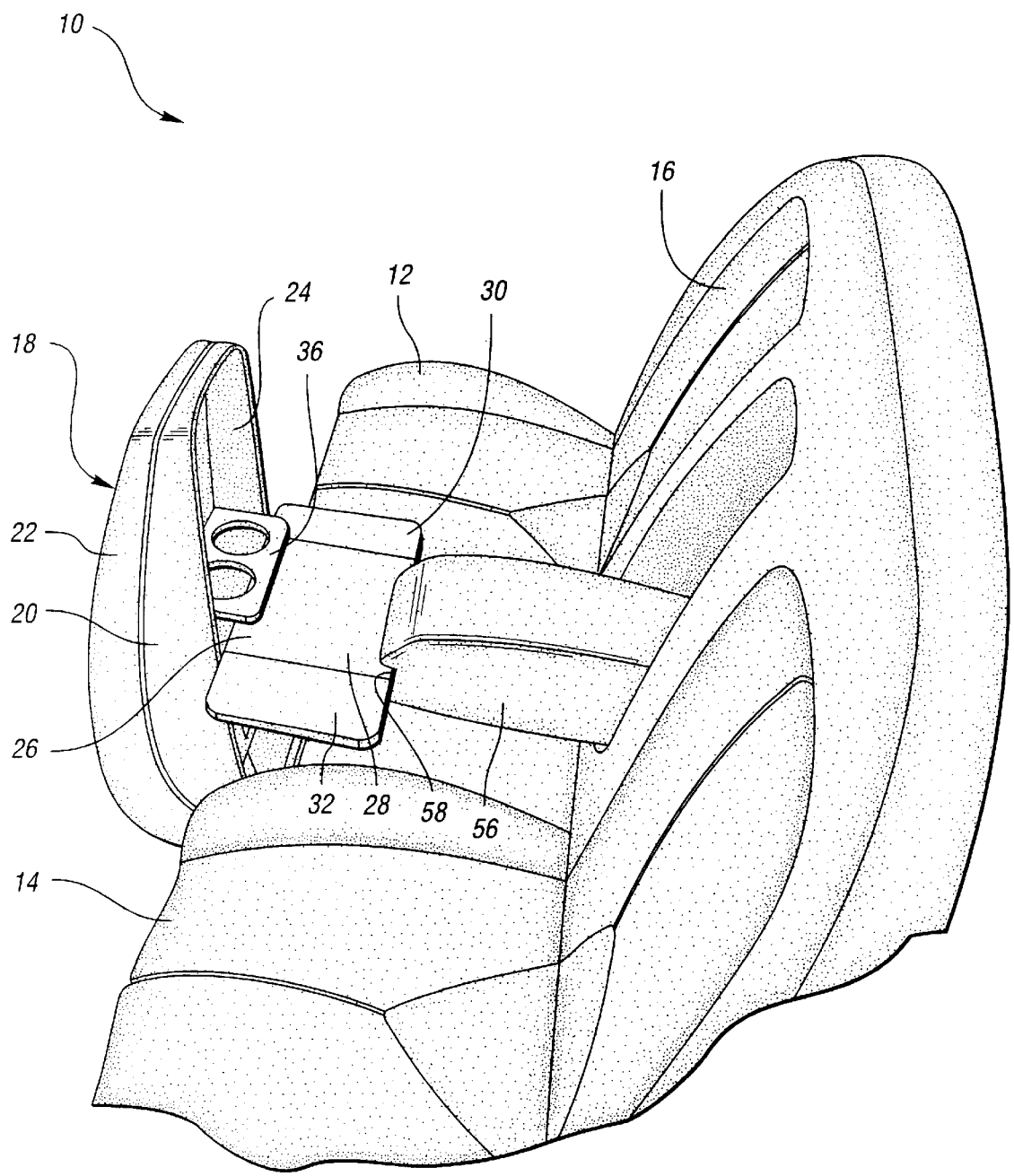
FIG. 1 shows a perspective view of a vehicle rear seat assembly incorporating a center seat portion with a utility compartment therein in accordance with the present invention.

Referring to FIG. 1, a vehicle rear seat assembly 10 is shown in accordance with the present invention. As shown, the vehicle rear seat assembly 10 includes left and right seat portions 12,14, and a seat back 16.

The rear seat assembly 10 further includes a center seat portion 18, which includes a center seat portion base 20 with a seat cushion 22 on one side thereof, and a utility compartment 24 on the opposing side of the base 20. The center seat portion 18 is pivotally mounted between the left and right seat portions 12,14 for pivotal movement between a collapsed position in which only the seat cushion 22 is exposed to facilitate seating thereon, and an upright position for facilitating access to the utility compartment 24, as shown in FIG. 1.

As shown in FIGS. 1 and 3, when the center seat portion 18 is in the upright position, a pivotable tray 26 may be pivoted to an extended position for providing a user surface 28 for rear seat occupants. The user surface 28 may be used for supporting beverages, reading or writing material, a laptop computer, etc. In order to expand the user surface 28, the pivotable tray 26 is further provided with slidable side leaves 30,32 connected to the tray 26 for expanding the user surface 28 by sliding laterally with respect to the tray 26.

Referring to FIGS. 1 and 3, the utility compartment 24 further includes a cupholder 36 which is pivotally connected within the utility compartment 24 for movement between a stored position, shown in phantom in FIG. 3, and a use position, in which the cupholder 36 is suspended above, or rests against, the user surface 28 of the pivotable tray 26. The cupholder 36 includes cupholder apertures 38,40 for supporting cups therein.

As shown in FIG. 3, the center seat portion 18 also includes a reading light 42 therein for lighting the user surface 28 and surrounding area.

Alternatively, as shown in FIG. 2, the utility compartment may comprise a mobile phone storage compartment 44 for storing a mobile phone 46, as well as a tissue holder 48 for dispensing tissue.

The pivotal connection between the center seat portion 18 and the seat assembly may be accomplished in a variety of ways. For example, a pivot joint 50 is shown for making such pivotal connection.

As further shown in FIG. 2, the pivotable seat tray 26 may be snapped to a closed position, and may be reopened by means of the notch 52 formed therein.

In a preferred embodiment, as shown in FIG. 1, the seat back 16 is provided with an arm rest portion 56 pivotally connected with respect to the seat back 16, and including a slot 58 formed therein for cooperation with the pivotable tray 26 for supporting the tray in the extended position to support excessive weight when necessary.

FIGS. 4–6 illustrate front, rear, bottom, and plan views of the center seat portion shown in FIG. 3.

FIG. 5 is identical in all other respects to the embodiment shown in FIG. 3, except that the storage net 60 has been added.

The center seat portion 18 preferably takes up approximately 20% of the lateral space of the seat assembly when in the closed position.

Figure 8:
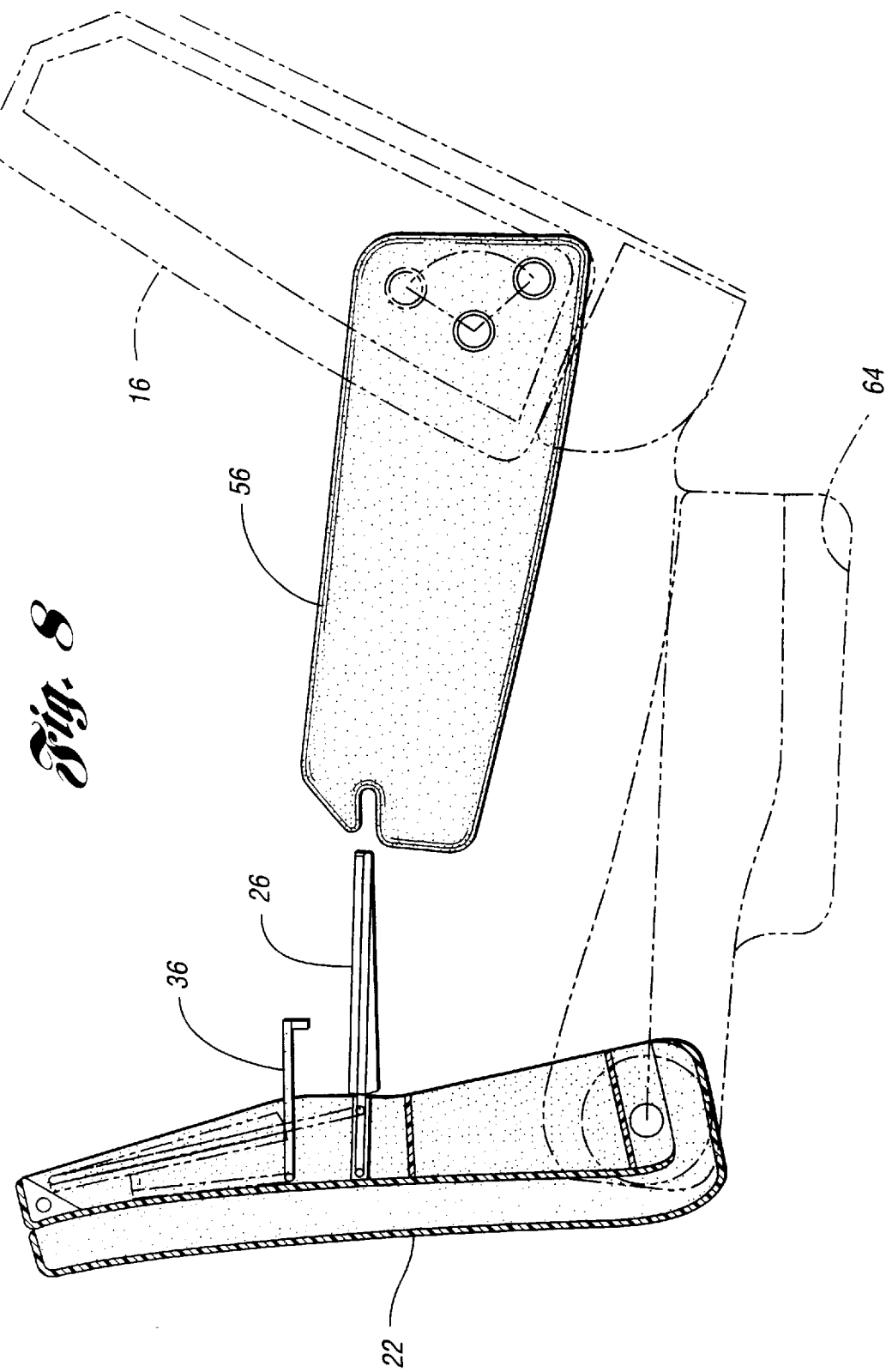
FIG. 8 shows a schematically arranged side view of a rear seat assembly incorporating a center seat portion in accordance with an alternative embodiment of the present invention.
Figure 9:
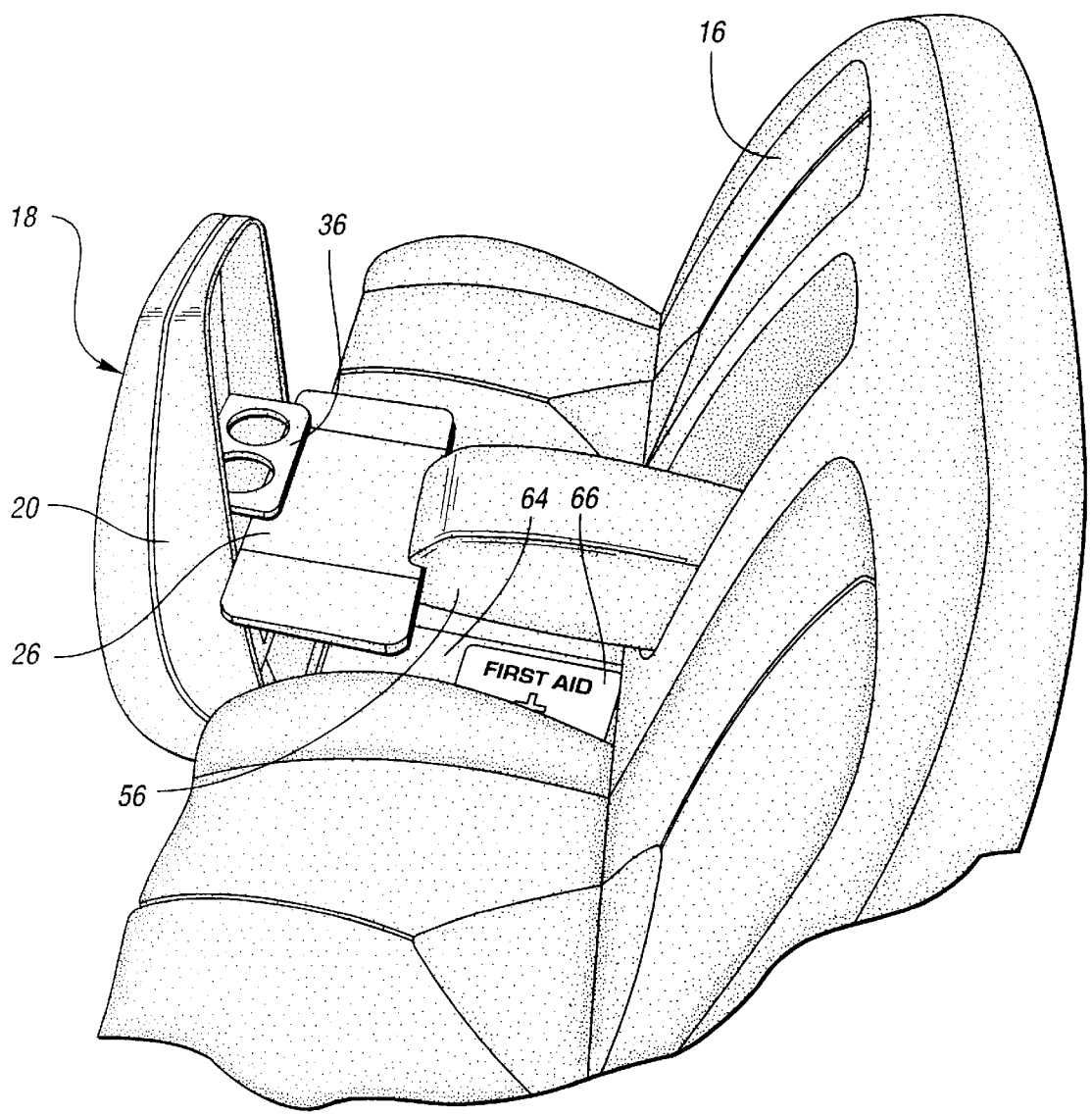
FIG. 9 shows a perspective view of a vehicle rear seat assembly incorporating a center seat portion in accordance with the embodiment shown in FIG. 8.

Turning to FIGS. 8 and 9, an alternative embodiment is illustrated. In this embodiment, an additional storage space 64 is provided for storage of items, such as a first aid kit 66 beneath the center seat portion 18. The storage compartment 64 makes use of normally unused space beneath the center of the seat. The embodiment illustrated in FIGS. 8 and 9 is in all other respects similar to the embodiment shown in FIG. 1, except for the storage compartment 64.

This invention provides the capability of storing the cupholder and tray assembly, as well as other utility compartment components, inside the seat assembly, which is normally an unused space. Also, with the center seat portion 18 in the closed position, the utility compartment and its contents do not provide any aesthetic problems within the vehicle interior, as such components are completely hidden.

While the best modes for carrying out the invention have been described in detail, those familiar with the art to which this invention relates will recognize various alternative designs and embodiments for practicing the invention within the scope of the appended claims.

What is claimed is:

1. A vehicle rear seat assembly, comprising:

left and right seat portions;

a center seat portion positioned between said left and right seat portions and pivotally connected with respect to said left and right seat portions, wherein said center seat portion has a seat cushion on one side and a utility compartment on an opposing side thereof, and wherein said center seat portion is pivotable between a collapsed position for seating and an upright position for facilitating access to the utility compartment;

wherein said utility compartment comprises a pivotable tray mounted therein for pivotal movement to a position extended from the utility compartment for providing a user surface when the center seat portion is in the upright position; and wherein said pivotable tray further includes moveable side leaves connected thereto for expanding the user surface by moving laterally with respect to the pivotable tray.

2. The vehicle rear seat assembly of claim 1, wherein said utility compartment further comprises a mobile phone storage compartment.

3. The vehicle rear seat assembly of claim 1, further comprising:

a seat back positioned adjacent the left, right and center seat portions; and an armrest pivotally connected with respect to the seat back and including a slot formed therein for cooperation with the tray for supporting the tray in the extended position.

4. The vehicle rear seat assembly of claim 1, further comprising a pivotable cupholder which is pivotally connected within the utility compartment for movement between a stored position and a use position in which the cupholder is disposed in a horizontal position for use.

5. The vehicle rear seat assembly of claim 1, further comprising a reading light positioned within the utility compartment.

6. A vehicle center rear seat portion adapted for attachment between left and right rear seat portions, the center seat portion comprising:

a center seat portion base having a pivot joint to facilitate pivotal connection with respect to the left and rear seat portions;

a seat cushion positioned on one side of the base;

a utility compartment positioned on the opposing side of the base;

wherein said center seat portion is adapted for pivotal movement between a collapsed position for seating on the cushion and an upright position for facilitating access to the utility compartment;

wherein said utility compartment comprises a pivotable tray mounted therein for pivotal movement to a position extended from the utility compartment for providing a user surface when the center seat portion is in the upright position; and a pivotable cupholder pivotally connected within the utility compartment for movement between a stored position and a use position in which the cupholder rests against the user surface of pivotable tray.

7. The vehicle rear seat portion of claim 6, wherein said pivotable tray further includes slidable side leaves connected thereto for expanding the user surface by sliding laterally with respect to the pivotable tray.

8. The vehicle rear seat portion of claim 6, further comprising a reading light positioned within the utility compartment.

9. The vehicle rear seat portion of claim 6, wherein said utility compartment further comprises a mobile phone storage compartment.

10. A vehicle rear seat assembly, comprising:

left and right seat portions;

a center seat portion positioned between said left and right seat portions and pivotally connected with respect to said left and right seat portions, wherein said center seat portion has a seat cushion on one side and a utility compartment on an opposing side thereof, and said center seat portion is pivotable between a collapsed position for seating and an upright position for facilitating access to the utility compartment;

wherein said utility compartment comprises a pivotable tray mounted therein for pivotal movement to a position extended from the utility compartment for providing a user surface when the center seat portion is in the upright position;

a seat back positioned adjacent the left, right and center seat portions; and an armrest pivotally connected with respect to the seat back and including a slot formed therein for cooperation with the tray for supporting the tray in the extended position.

11. The vehicle rear seat assembly of claim 10, wherein said pivotable tray further includes slidable side leaves connected thereto for expanding the user surface by sliding laterally with respect to the pivotable tray.

12. The vehicle rear seat assembly of claim 10, further comprising a pivotable cupholder which is pivotally connected within the utility compartment for movement between a stored position and a use position in which the cupholder rests against the user surface of the pivotable tray.

13. The vehicle rear seat assembly of claim 10, further comprising a reading light positioned within the utility compartment.

14. The vehicle rear seat assembly of claim 10, wherein said utility compartment further comprises a mobile phone storage compartment.

* * * * *

UNITED STATES PATENT AND TRADEMARK OFFICE
CERTIFICATE OF CORRECTION

PATENT NO. : 5,848,820
DATED : December 15, 1998
INVENTOR(S) : Robert Hecht, Roman Jach It is certified that error appears in the above-identified patent and that said Letters Patent is hereby corrected as shown below:

Column 4, Lines 38-42,   Delete lines 38-42.

Column 4, Line 46,   After "of" insert --the--, and after "tray" delete the period "." and insert --; and-- therefor.

Column 4, Line 47,   Insert the following paragraph:
--wherein said utility compartment comprises a pivotable tray mounted therein for pivotal movement to a position extended from the utility compartment for providing a user surface when the center seat portion is in the upright position.--

Signed and Sealed this

Sixth Day of July, 1999

Attest:

Attesting Officer

Q. TODD DICKINSON

Acting Commissioner of Patents and Trademarks